US008855550B2

United States Patent
Gaines et al.

(10) Patent No.: US 8,855,550 B2
(45) Date of Patent: *Oct. 7, 2014

(54) WIRELESS RELAY MODULE HAVING EMERGENCY CALL FUNCTIONALITY

(75) Inventors: Robert B. Gaines, Lake Saint Louis, MO (US); John Holste, Hamburg, IL (US); Thomas Lewis, O'Fallon, IL (US)

(73) Assignee: Covidien LP, Mansfield, MA (US)

( * ) Notice: Subject to any disclaimer, the term of this patent is extended or adjusted under 35 U.S.C. 154(b) by 477 days.

This patent is subject to a terminal disclaimer.

(21) Appl. No.: 13/334,459

(22) Filed: Dec. 22, 2011

(65) Prior Publication Data

US 2012/0184237 A1 Jul. 19, 2012

Related U.S. Application Data

(63) Continuation-in-part of application No. 13/006,769, filed on Jan. 14, 2011.

(51) Int. Cl.
| | | |
|---|---|---|
| *H04W 24/00* | (2009.01) | |
| *H04W 88/04* | (2009.01) | |
| *H04W 48/18* | (2009.01) | |
| *H04W 40/02* | (2009.01) | |
| H04W 76/00 | (2009.01) | |
| H04L 12/707 | (2013.01) | |

(52) U.S. Cl.
CPC ............ *H04W 48/18* (2013.01); *H04W 76/007* (2013.01); *H04W 88/04* (2013.01); *H04L 45/22* (2013.01); *H04W 24/00* (2013.01); *H04W 40/02* (2013.01)
USPC ................ 455/11.1; 455/7; 455/9; 455/15; 455/16; 455/41.1

(58) Field of Classification Search
USPC .............................. 455/7, 9, 15, 16, 41.1, 11.1
See application file for complete search history.

(56) References Cited

U.S. PATENT DOCUMENTS

| 5,451,839 A | 9/1995 | Rappaport et al. |
|---|---|---|
| 5,936,539 A | 8/1999 | Fuchs |

(Continued)

FOREIGN PATENT DOCUMENTS

| CA | 2 644 695 | 1/2004 |
|---|---|---|
| CA | 2 648 885 | 11/2007 |

(Continued)

OTHER PUBLICATIONS

Amendment filed Mar. 26, 2014, to Office Action dated Dec. 27, 2013; for U.S. Appl. No. 13/352,575; 12 pages.

(Continued)

*Primary Examiner* — Bobbak Safaipour
(74) *Attorney, Agent, or Firm* — Lisa E. Winsor, Esq.

(57) ABSTRACT

A system for networked communications between a series of medical devices, wireless relay modules, and a remote device wireless relay network and an internet-accessible wireless communication network. At least one relay module includes a receiver, a first transmitter coupled to the wireless relay network, a second transmitter coupled to the internet-accessible wireless communication network, and a controller. The controller determines whether the internet-accessible wireless communications network is accessible. If accessible, then medical device data is transmitted to a remote device over that network using the second transmitter. If not accessible, then the first transmitter is used to transmit medical device data to another wireless relay module over the wireless relay network. Additionally, the controller analyzes the medical device data to determine whether an emergency condition exists, and transmits the medical device data to an emergency responder if such condition occurs together with location data for an associated medical device.

24 Claims, 8 Drawing Sheets

(56) References Cited

U.S. PATENT DOCUMENTS

| | | |
|---|---|---|
| 6,221,012 B1 | 4/2001 | Maschke et al. |
| 6,377,162 B1 | 4/2002 | Delestienne et al. |
| 6,377,806 B1 | 4/2002 | Tokuyoshi |
| 6,442,433 B1 | 8/2002 | Linberg |
| 6,519,569 B1 | 2/2003 | White et al. |
| 6,578,002 B1 | 6/2003 | Derzay et al. |
| 6,790,198 B1 | 9/2004 | White et al. |
| 6,839,753 B2 | 1/2005 | Biondi et al. |
| 7,028,182 B1 | 4/2006 | Killcommons |
| 7,050,984 B1 | 5/2006 | Kerpelman et al. |
| 7,082,460 B2 | 7/2006 | Hansen et al. |
| 7,178,149 B2 | 2/2007 | Hansen |
| 7,185,014 B1 | 2/2007 | Hansen |
| 7,236,936 B2 | 6/2007 | White et al. |
| 7,294,105 B1 | 11/2007 | Islam |
| 7,316,648 B2 | 1/2008 | Kelly |
| 7,349,947 B1 | 3/2008 | Slage et al. |
| 7,508,787 B2 | 3/2009 | Doshi et al. |
| 7,529,561 B2 | 5/2009 | Heinonen et al. |
| 7,539,532 B2 | 5/2009 | Tran |
| 7,539,533 B2 | 5/2009 | Tran |
| 7,558,622 B2 | 7/2009 | Tran |
| 7,613,169 B2 | 11/2009 | Vaittinen et al. |
| 7,645,258 B2 | 1/2010 | White et al. |
| 7,707,047 B2 | 4/2010 | Hasan et al. |
| 7,733,224 B2 | 6/2010 | Tran |
| 7,749,164 B2 | 7/2010 | Davis |
| 7,752,058 B2 | 7/2010 | Sasaki et al. |
| 7,827,040 B2 | 11/2010 | Brown |
| 7,873,772 B2 | 1/2011 | Waldhoff et al. |
| 7,937,370 B2 | 5/2011 | Hansen |
| 7,942,844 B2 | 5/2011 | Moberg et al. |
| 7,949,404 B2 | 5/2011 | Hill |
| 7,978,062 B2 | 7/2011 | Lalonde et al. |
| 8,002,701 B2 | 8/2011 | John et al. |
| RE42,934 E | 11/2011 | Thompson |
| 8,073,008 B2 | 12/2011 | Mehta et al. |
| 8,095,381 B2 | 1/2012 | Simmons et al. |
| 8,108,543 B2 | 1/2012 | Hansen |
| 8,125,318 B2 | 2/2012 | Heimbrock et al. |
| 8,126,728 B2 | 2/2012 | Dicks et al. |
| 8,126,729 B2 | 2/2012 | Dicks et al. |
| 8,126,730 B2 | 2/2012 | Dicks et al. |
| 8,126,732 B2 | 2/2012 | Dicks et al. |
| 8,126,733 B2 | 2/2012 | Dicks et al. |
| 8,126,734 B2 | 2/2012 | Dicks et al. |
| 8,126,735 B2 | 2/2012 | Dicks et al. |
| 8,131,564 B2 | 3/2012 | Dicks et al. |
| 8,131,565 B2 | 3/2012 | Dicks et al. |
| 8,131,566 B2 | 3/2012 | Dicks et al. |
| 8,140,356 B2 | 3/2012 | Dicks et al. |
| 8,155,982 B2 | 4/2012 | Dicks et al. |
| 8,200,195 B2 | 6/2012 | Le Saint et al. |
| 8,214,549 B2 | 7/2012 | Dicks et al. |
| 8,326,648 B2 | 12/2012 | Kenedy et al. |
| 8,373,556 B2 | 2/2013 | LaLonde et al. |
| 8,395,498 B2 | 3/2013 | Gaskill et al. |
| 8,428,722 B2 | 4/2013 | Verhoef et al. |
| 8,515,547 B2 | 8/2013 | Mass et al. |
| 8,587,427 B2 | 11/2013 | LaLonde et al. |
| 8,694,600 B2 * | 4/2014 | Gaines et al. .................. 709/217 |
| 2002/0178126 A1 | 11/2002 | Beck et al. |
| 2002/0198473 A1 | 12/2002 | Kumar et al. |
| 2004/0155772 A1 | 8/2004 | Medema et al. |
| 2004/0204743 A1 | 10/2004 | McGrath et al. |
| 2005/0010093 A1 | 1/2005 | Ford et al. |
| 2005/0185398 A1 | 8/2005 | Scannell, Jr. |
| 2005/0188853 A1 | 9/2005 | Scannell, Jr. |
| 2005/0201300 A1 | 9/2005 | Bridgelall |
| 2005/0243988 A1 | 11/2005 | Barclay et al. |
| 2005/0288571 A1 | 12/2005 | Perkins et al. |
| 2006/0154642 A1 | 7/2006 | Scannell, Jr. |
| 2006/0238333 A1 | 10/2006 | Welch et al. |
| 2007/0106126 A1 | 5/2007 | Mannheimer et al. |
| 2007/0156033 A1 | 7/2007 | Causey, III et al. |
| 2007/0180140 A1 | 8/2007 | Welch et al. |
| 2007/0186923 A1 * | 8/2007 | Poutiatine et al. ....... 128/200.14 |
| 2007/0216764 A1 | 9/2007 | Kwak |
| 2007/0230197 A1 | 10/2007 | Scannell, Jr. |
| 2007/0253380 A1 | 11/2007 | Jollota et al. |
| 2007/0254593 A1 | 11/2007 | Jollota et al. |
| 2007/0255125 A1 | 11/2007 | Moberg et al. |
| 2007/0255250 A1 | 11/2007 | Moberg et al. |
| 2007/0258395 A1 | 11/2007 | Jollota et al. |
| 2007/0268687 A1 | 11/2007 | Scannell, Jr. |
| 2007/0276270 A1 | 11/2007 | Tran |
| 2008/0004907 A1 | 1/2008 | Bayne |
| 2008/0012761 A1 | 1/2008 | Derrick et al. |
| 2008/0071234 A1 | 3/2008 | Kelch et al. |
| 2008/0097550 A1 | 4/2008 | Dicks et al. |
| 2008/0097551 A1 | 4/2008 | Dicks et al. |
| 2008/0097552 A1 | 4/2008 | Dicks et al. |
| 2008/0097793 A1 | 4/2008 | Dicks et al. |
| 2008/0097908 A1 | 4/2008 | Dicks et al. |
| 2008/0097909 A1 | 4/2008 | Dicks et al. |
| 2008/0097910 A1 | 4/2008 | Dicks et al. |
| 2008/0097911 A1 | 4/2008 | Dicks et al. |
| 2008/0097912 A1 | 4/2008 | Dicks et al. |
| 2008/0097913 A1 | 4/2008 | Dicks et al. |
| 2008/0097914 A1 | 4/2008 | Dicks et al. |
| 2008/0097917 A1 | 4/2008 | Dicks et al. |
| 2008/0108880 A1 | 5/2008 | Young et al. |
| 2008/0183502 A1 | 7/2008 | Dicks et al. |
| 2008/0224852 A1 | 9/2008 | Dicks et al. |
| 2008/0281168 A1 | 11/2008 | Gibson et al. |
| 2009/0019061 A1 | 1/2009 | Scannell, Jr. |
| 2009/0023391 A1 | 1/2009 | Falck |
| 2009/0058635 A1 | 3/2009 | LaLonde et al. |
| 2009/0058636 A1 | 3/2009 | Gaskill et al. |
| 2009/0062887 A1 | 3/2009 | Mass et al. |
| 2009/0063187 A1 * | 3/2009 | Johnson et al. .................. 705/2 |
| 2009/0063193 A1 | 3/2009 | Barton et al. |
| 2009/0073694 A1 | 3/2009 | Scannell, Jr. |
| 2009/0105549 A1 | 4/2009 | Smith et al. |
| 2009/0115628 A1 | 5/2009 | Dicks et al. |
| 2009/0128320 A1 | 5/2009 | Needham et al. |
| 2009/0184835 A1 | 7/2009 | Deaver, Sr. et al. |
| 2009/0203329 A1 | 8/2009 | White et al. |
| 2009/0234672 A1 | 9/2009 | Dicks et al. |
| 2009/0247114 A1 | 10/2009 | Sennett et al. |
| 2009/0252117 A1 | 10/2009 | Sherman et al. |
| 2009/0299788 A1 | 12/2009 | Huber et al. |
| 2009/0306747 A1 | 12/2009 | Fischer et al. |
| 2010/0011000 A1 | 1/2010 | Chakara et al. |
| 2010/0027518 A1 | 2/2010 | Wang |
| 2010/0077115 A1 | 3/2010 | Rofougran |
| 2010/0079276 A1 | 4/2010 | Collins et al. |
| 2010/0080200 A1 | 4/2010 | Stewart |
| 2010/0082371 A1 | 4/2010 | Kamp et al. |
| 2010/0085948 A1 | 4/2010 | Yu et al. |
| 2010/0117835 A1 | 5/2010 | Nanikashvili |
| 2010/0138235 A1 | 6/2010 | Marks et al. |
| 2010/0166170 A1 | 7/2010 | East |
| 2010/0198142 A1 | 8/2010 | Sloan et al. |
| 2010/0217723 A1 | 8/2010 | Sauerwein, Jr. et al. |
| 2010/0219250 A1 | 9/2010 | Wang |
| 2010/0234695 A1 | 9/2010 | Morris |
| 2010/0260061 A1 | 10/2010 | Bojahra et al. |
| 2010/0279647 A1 | 11/2010 | Jacobs et al. |
| 2010/0292556 A1 | 11/2010 | Golden |
| 2010/0317286 A1 | 12/2010 | Jung et al. |
| 2010/0318578 A1 | 12/2010 | Treu et al. |
| 2011/0021902 A1 | 1/2011 | Kim et al. |
| 2011/0032822 A1 | 2/2011 | Soomro |
| 2011/0066555 A1 | 3/2011 | Dicks et al. |
| 2011/0078441 A1 | 3/2011 | Dicks et al. |
| 2011/0087756 A1 | 4/2011 | Biondi et al. |
| 2011/0093283 A1 | 4/2011 | Dicks et al. |
| 2011/0093284 A1 | 4/2011 | Dicks et al. |
| 2011/0093285 A1 | 4/2011 | Dicks et al. |
| 2011/0093286 A1 | 4/2011 | Dicks et al. |
| 2011/0093287 A1 | 4/2011 | Dicks et al. |
| 2011/0093297 A1 | 4/2011 | Dicks et al. |
| 2011/0148624 A1 | 6/2011 | Eaton et al. |

(56) References Cited

U.S. PATENT DOCUMENTS

| | | | |
|---|---|---|---|
| 2011/0158430 A1 | 6/2011 | Dicks et al. | |
| 2011/0161111 A1 | 6/2011 | Dicks et al. | |
| 2011/0179405 A1 | 7/2011 | Dicks et al. | |
| 2011/0255454 A1 | 10/2011 | Hauser et al. | |
| 2011/0270045 A1 | 11/2011 | Lebel et al. | |
| 2011/0273287 A1 | 11/2011 | LaLonde et al. | |
| 2011/0280224 A1 | 11/2011 | Falck et al. | |
| 2011/0282671 A1 | 11/2011 | Dicks et al. | |
| 2011/0292862 A1 | 12/2011 | Shimizu | |
| 2012/0004925 A1 | 1/2012 | Braverman et al. | |
| 2012/0108917 A1 | 5/2012 | Libbus et al. | |
| 2012/0182143 A1* | 7/2012 | Gaines et al. | 340/539.12 |
| 2012/0182894 A1* | 7/2012 | Gaines et al. | 370/252 |
| 2012/0182924 A1* | 7/2012 | Gaines et al. | 370/315 |
| 2012/0182927 A1* | 7/2012 | Wiesner et al. | 370/315 |
| 2012/0184207 A1* | 7/2012 | Gaines et al. | 455/11.1 |
| 2012/0184237 A1* | 7/2012 | Gaines et al. | 455/404.1 |
| 2012/0185268 A1* | 7/2012 | Wiesner et al. | 705/2 |
| 2012/0226768 A1* | 9/2012 | Gaines et al. | 709/217 |
| 2012/0226771 A1* | 9/2012 | Harrington et al. | 709/217 |
| 2012/0256751 A1 | 10/2012 | Nallabelli et al. | |
| 2012/0293323 A1 | 11/2012 | Kaib et al. | |
| 2013/0015966 A1 | 1/2013 | Soomro et al. | |
| 2013/0021169 A1 | 1/2013 | Soomro et al. | |
| 2013/0022022 A1 | 1/2013 | Schmitt | |
| 2013/0066644 A1 | 3/2013 | Dicks et al. | |
| 2013/0147622 A1 | 6/2013 | LaLonde et al. | |
| 2013/0154851 A1 | 6/2013 | Gaskill et al. | |
| 2013/0162426 A1* | 6/2013 | Wiesner et al. | 340/539.1 |
| 2013/0278414 A1 | 10/2013 | Sprigg et al. | |
| 2013/0310896 A1 | 11/2013 | Mass | |
| 2014/0009271 A1 | 1/2014 | Collins et al. | |
| 2014/0062718 A1 | 3/2014 | LaLonde et al. | |
| 2014/0142979 A1* | 5/2014 | Mitsunaga | 705/3 |
| 2014/0152466 A1* | 6/2014 | Wiesner et al. | 340/870.07 |

FOREIGN PATENT DOCUMENTS

| | | |
|---|---|---|
| CA | 2 644 635 | 8/2008 |
| CN | 101601040 A | 12/2009 |
| EP | 2227063 A1 | 9/2010 |
| JP | 2003109160 | 4/2003 |
| JP | 2006520657 | 9/2006 |
| JP | 2007531442 | 11/2007 |
| JP | 2008108170 | 5/2008 |
| JP | 2009-535715 A | 1/2009 |
| JP | 2010-524050 A | 7/2010 |
| JP | 2011-502369 A | 1/2011 |
| KR | 10-2008-0016458 A | 2/2008 |
| KR | 10-2009-0122968 A | 12/2009 |
| KR | 10-2010-0028318 A | 3/2010 |
| WO | WO 94/16617 | 8/1994 |
| WO | WO 98/14228 A1 | 4/1998 |
| WO | WO 03/048919 A1 | 6/2003 |
| WO | WO 2004/070994 A2 | 8/2004 |
| WO | WO 2004/070994 A3 | 8/2004 |
| WO | WO 2004/084720 A2 | 10/2004 |
| WO | WO 2005/057294 A1 | 6/2005 |
| WO | WO 2005/057834 A2 | 6/2005 |
| WO | WO 2005/098736 A2 | 10/2005 |
| WO | WO 2007/124091 A1 | 11/2007 |
| WO | WO 2007/127879 A2 | 11/2007 |
| WO | WO 2008/052034 A1 | 5/2008 |
| WO | WO 2008/097316 A1 | 8/2008 |
| WO | WO 2009/032134 A2 | 3/2009 |
| WO | WO 2009/063303 A1 | 5/2009 |

OTHER PUBLICATIONS

Amendment filed Mar. 26, 2014; to Office Action dated Jan. 7, 2014; for U.S. Appl. No. 13/353,565; 15 pages.
Amendment and Response to Restriction Requirement for Office Action dated Feb. 10, 2014; filed Mar. 21, 2014; for U.S. Appl. No. 13/352,608; 7 pages.
Letter from CCPIT Patent and Trademark Law Office dated Mar. 3, 2014; for Chinese Pat. App. No. 201280011025.0; 1 page.
Chinese Voluntary Amendment (including English translation) received Mar. 3, 2014; for Chinese Pat. App. No. 201280011025.0; 16 pages.
Notice of Allowance dated Apr. 30, 2014; for U.S. Appl. No. 13/241,620; 21 pages.
Office Action dated Apr. 29, 2014; for U.S. Appl. No. 13/352,608; 50 pages.
Mexican Official Action received May 2, 2014, for Mexican Pat. App. No. MX/A2013/008157; 3 pages.
European Response filed Mar. 3, 2014; to Official Communication dated Aug. 22, 2013; and to the Written Opinion; for European Pat. App. No. 12704944.3; 15 pages.
European Response filed Mar. 3, 2014; to Official Communication dated Aug. 22, 2013; and to the Written Opinion; for European Pat. App. No. 12701584.0; 11 pages.
PCT Search Report and Written Opinion of the ISA dated Mar. 4, 2014; for PCT Pat. App. No. PCT/US2013/059703; 12 pages.
Office Action dated Sep. 5, 2013, for U.S. Appl. No. 13/006,769, 36 pages.
Office Action dated May 27, 2014; for U.S. Appl. No. 13/334,463; 48 pages.
Mexican Notice of Allowance dated May 7, 2014; for Mexican Pat. App. No. MX/a/2013/009985; 2 pages.
Mexican Office Action received Apr. 22, 2014; for Mexican Pat. App. No. MX/a/2013/008154; 4 pages.
Response to Office Action dated Apr. 29, 2014 for U.S. Appl. No. 13/352,608, filed Jan. 18, 2012.
Notice of Allowance dated Jun. 6, 2014 for U.S. Appl. No. 14/154,285, filed Jan. 14, 2014.
Notice of Allowance dated Jun. 9, 2014 for U.S. Appl. No. 13/006,769, filed Jan. 14, 2011.
Response filed Jul. 12, 2013; to Final Office Action dated May 22, 2013; for U.S. Appl. No. 13/037,886; 14 pages.
Office Action; dated May 15, 2013; for U.S. Appl. No. 13/006,784; 35 pages.
Article 19 Amendment; dated Nov. 16, 2012; for PCT Pat. App. No. PCT/US2012/021007; 7 pages.
Article 19 Amendment; dated Feb. 4, 2013; for PCT Pat. App. No. PCT/US2012/025906; 9 pages.
PCT International Preliminary Report on Patentability; dated Jul. 25, 2013; for PCT Pat. App. No. PCT/US2012/021007; 12 pages.
PCT International Search Report; dated Aug. 2, 2012; for PCT Pat. App. No. PCT/US2012/021008.
PCT International Preliminary Report on Patentability; dated Jul. 25, 2013; for PCT Pat. App. No. PCT/US2012/021008; 7 pages.
PCT International Preliminary Report on Patentability of the ISA; dated Sep. 12, 2013; for PCT Pat. App. No. PCT/US2012/025906; 14 pages.
Notice of Allowance; dated Oct. 9, 2013; for U.S. Appl. No. 13/037,886; 11 pages.
Atmel Corporation, "ZigBee PRO Stack and Software Development Kit," http://www.meshnetics.com/wsn-software/, Nov. 4, 2011.
Bacheldor, "Hospital Tries ZigBee to Track Patients," RFID Journal, Jul. 21, 2006.
BelAir Networks, "Capacity of Wireless Mesh Networks," white paper, 2006.
Bogia, "Enabling the future of u-Health—IEEE 11073 Personal Health Device Standards," slides, Sep. 16, 2009.
Bowman, "Newly Ratified ZigBee Health Care Profile Now Available for Public Download," http://www.fiercehealthcare.com/node/40708, Apr. 6, 2010.
Craig, "ZigBee Networks," http://medicaldesign.com/electrical-components/zigbee_networks/, Apr. 1, 2005.
Craig, "ZigBee: 'Wireless Control That Simply Works'," https://docs.zigbee.org/zigbee-docs/dcn/04-1427.pdf, prior to Jan. 2011.
Digi International Inc., "ConnectPort® X4 H," retrieved from the Internet: http://www.digi.com, 2008-2010.
Digi International Inc., "Demystifying 802.15.4 and ZigBee®," white paper, retrieved from the Internet: http://www.digi.com, 2008-2010.

(56) References Cited

OTHER PUBLICATIONS

Digi International Inc., "XBee® & XBee-PRO® ZB," retrieved from the Internet: http://www.digi.com, 2008-2010.
Digi International Inc., "XBee® & XBee-PRO® ZB ZigBee® PRO RF Modules," http://www.digi.com/products/wireless/zigbee-mesh/xbee-zb-module.jsp, Nov. 2, 2010.
Dvorak, "Remote Monitoring," http://medicaldesign.com/electrical-components/remote_monitoring/index.html, Apr. 1, 2005.
ENP Newswire, "Freescale products achieve ZigBee Health Care Certification," May 19, 2010.
Huang, "Medical electronics: from hospital and clinic to the home," http://www.eetimes.com/General/DisplayPrintViewContent?contentltemid=4211247, Dec. 8, 2010.
ICP DAS, "ZigBee Converter User's Manual," Sep. 22, 2008.
Le, "Designing a ZigBee-ready IEEE 802.15.4-compliant radio transceiver," http://rfdesign.com/mag/411rfdf4.pdf, Nov. 2004.
Norris et al., "Single-chip ZigBee for Indoor Mobile Telemetry," presentation, Jun. 21, 2005.
Pinto, "WMM—Wireless Mesh Monitoring," Technical report, 2009.
Sailhan et al., "Wireless Mesh Network Monitoring: Design, Implementation and Experiments," In proc. of IEEE Workshop on Distributed Autonomous Network Management (DANMS), 2007.
Skibniewski et al, "Ubiquitous Computing: Object Tracking and Monitoring Inconstruction Processes Utilizing Zigbee™ Networks," The 23th International Symposium on Automation and Robotics in Construction (ISARC2006), Oct. 3-5, Tokyo, Japan.
Stewart, "Build reliable Zigbee-based solutions," EE Times-Asia, Apr. 16-30, 2007.
Texas Instruments, "Choose your ZigBee solution with TI," 1Q 2010.
Texas Instruments, "Consumer Medical Applications Guide," retrieved from the Internet: http://www.ti.com/medical, 2010.
Texas Instruments, "RF/IF and ZigBee® Solutions," http://focus.ti.com/analog/docs/gencontent.tsp?familyid=367&genContentid=24190&DC . . . , Dec. 8, 2010.
Texas Instruments, "ZigBee® Wireless Networking Overview," 1 page, 2010.
The Silicon Horizon Inc., "techFX Zigbee rev A-techFX Zigbee Tools v 1.0," 2007-2008.
Tutorial-Reports.com, "Zigbee Tutorial," http://www.tutorial-reports.com/book/print/152, Nov. 1, 2010.
Unknown author, "The Nokia Network Monitor Introduction," http://www.panuworld.net/nuukiaworld/misc/netmon/index.htm, Oct. 30, 2005.
Versel, "ZigBee Alliance ratifies wireless protocol for low-power medical devices," retrieved from the Internet: http://www.fiercemobilehealthcare.com, Apr. 6, 2010.
Wellspring, "Router, Gateway, Base Station, Cell Modem Specification and Submittal," http://www.h2odegree.com/documents/ReferenceLibrary/OtherProductLiterature/RouterGatewayBaseSpecSheetSubmittal.pdf, 5 pages, prior to Jan. 2011.
Wellspring, "Wellspring Switches to a ZigBee-Cellular Hybrid System," press release, Feb. 20, 2006.
ZigBee Alliance, "ZigBee Wireless Sensor Applications for Health, Wellness and Fitness," https://docs.zigbee.org/zigbee-docs/dcn/09-4962.pdf, Mar. 2009.
Office Action dated Dec. 27, 2013; for U.S. Appl. No. 13/352,575; 31 pages.
Response filed Feb. 18, 2014 for Office Action dated Sep. 27, 2013 for U.S. Appl. No. 13/241,620; 24 pages.
Response filed Feb. 13, 2014 for Office Action dated Sep. 5, 2013 for U.S. Appl. No. 13/006,769; 18 pages.
Request for Continued Examination filed Jan. 24, 2014; for U.S. Appl. No. 13/037,886; 2 pages.
Response filed with RCE on Feb. 13, 2014 for Final Office Action dated Dec. 2, 2013 for U.S. Appl. No. 13/006,784; 24 pages.
Miche, et al., "The Internet of Vehicles or the Second Generation of Telematic Services", ERCIM News, ERCIM, Paris, FR, vol. 77, Apr. 1, 2009, pp. 43-45.
Kawai et al., "Proposal of an Assured Corridor Mechanism for Urgent Information Transmission In Wireless Sensor Networks", IEICE Trans. on Commun., vol. E90B, No. 10, Oct. 1, 2007, pp. 2817-2826, XP001508610.
International Search Report and Written Opinion of the International Searching Authority for PCT/US2012/021007, dated Sep. 20, 2012, 19 pages.
International Search Report and Written Opinion of the International Searching Authority for PCT/US2012/068895, dated Mar. 15, 2013, 15 pages.
International Search Report and Written Opinion of the International Searching Authority for PCT/US2013/020069, dated Feb. 1, 2013, 9 pages.
International Search Report and Written Opinion of the International Searching Authority for PCT/US2013/020071, dated Feb. 1, 2013, 10 pages.
International Search Report and Written Opinion of the International Searching Authority for PCT/US2012/025906, dated Dec. 3, 2012, 21 pages.
Office Action dated Nov. 16, 2012 for U.S. Appl. No. 13/037,886, filed Mar. 1, 2011, 19 pages.
Response to Office Action dated Nov. 16, 2012 for U.S. Appl. No. 13/037,886, filed Feb. 15, 2013.
Office Action; dated May 15, 2013; for U.S. Appl. No. 13/006,784; 37 pages.
Office Action dated May 22, 2013; for U.S. Appl. No. 13/037,886; 14 pages.
PCT Search Report and Written Opinion of the ISA; dated Apr. 1, 2013; for PCT Pat. App. No. PCT/US2012/068892; 12 pages.
PCT Search Report and Written Opinion of the ISA; dated Apr. 1, 2013; for PCT Pat. App. No. PCT/US2012/068888; 15 pages.
PCT Search Report and Written Opinion of the ISA; dated Apr. 29, 2013; for PCT Pat. App. No. PCT/US2013/021530; 10 pages.
European Comments on Written Opinion dated Nov. 8, 2013; for EP Pat. App. No. 12708203.0; 2 pages.
Final Office Action dated Dec. 2, 2013; for U.S. Appl. No. 13/006,784; 38 pages.
Response filed Aug. 14, 2013; to Office Action dated May 15, 2013; for U.S. Appl. No. 13/006,784; 13 pages.
Office Action dated Jan. 7, 2014; for U.S. Appl. No. 13/353,565; 33 pages.
Final Office Action dated Aug. 6, 2014; for U.S. Appl. No. 13/352,608; 38 pages.
PCT International Preliminary Report on Patentability of the ISA dated Jul. 31, 2014; for PCT Pat. App. No. PCT/US2013/020069; 6 pages.
PCT International Preliminary Report on Patentability of the ISA dated Jul. 31, 2014; for PCT Pat. App. No. PCT/US2013/020071; 6 pages.
Singapore Written Opinion dated Jul. 25, 2014; for Singapore Pat. App. No. 2013053244; 7 pages.
U.S. Response to 312 Amendment dated Jul. 21, 2014; for U.S. Appl. No. 14/154,285; 3 pages.
Japanese Office Action (including English translation) dated Jun. 23, 2014; for Japanese Pat. App. No. 2013-549532 6 pages.
PCT International Preliminary Report on Patentability of the ISA dated Jul. 3, 2014; for PCT Pat. App. No. PCT/US2012/068892; 8 pages.
PCT International Preliminary Report on Patentability of the ISA dated Jul. 3, 2014; for PCT Pat. App. No. PCT/US2012/068888; 8 pages.
Singapore Written Opinion dated Jun. 18, 2014; for Singapore Pat. App. No. 2013053236; 11 pages.
Singapore Written Opinion dated Jun. 19, 2014; for Singapore Pat. App. No. 2013065230; 22 pages.
Response filed (with English Language Passage) of Mexican Office Action received Jul. 7, 2014; for Mexican Pat. App. No. MX/a/2013/008154; 16 pages.
Office Action dated Jun. 16, 2014 for U.S. Appl. No. 13/353,565, filed Jan. 19, 2012.
Japanese Office Action dated May 30, 2014 for Application No. 2013-549531.

(56) References Cited

OTHER PUBLICATIONS

Notice of Allowance for U.S. Appl. No. 13/352,575, filed Jan. 18, 2012.
Office Action dated Jun. 20, 2014 for U.S. Appl. No. 13/334,447, filed Dec. 22, 2011.
U.S. Appl. No. 14/308,881, filed Jun. 19, 2014, Gaines, et al.
European Search Report dated Jun. 14, 2014; for European Patent Application No. 14168075.1-1951; 8 pages.
Response with Terminal Disclaimer filed Jul. 30, 2014; to Office Action dated Jun. 20, 2014; for U.S. Appl. No. 13/334,447; 15 pages.
Response with Terminal Disclaimer filed Jul. 30, 3014; to Office Action dated Jun. 23, 2014; for U.S. Appl. No. 13/334,459; 13 pages.
Response filed Jul. 30, 3014; to Final Office Action dated Jun. 16, 2014; to U.S. Appl. No. 13/353,565; 22 pages.
Response filed Aug. 4, 2014; to Office Action dated May 27, 2014; for U.S. Appl. No. 13/334,463; 21 pages.
Mexican Response to Office Action received Jul. 29, 2014; for Mexican Pat. App. No. MX/a/2013/008157; 14 pages.
PCT International Preliminary Report on Patentability dated Jul. 3, 2014; for PCT Pat. App. No. PCT/US2012/068895; 10 pages.

\* cited by examiner

423

| Codes | Description | Harm Time | Priority | Related Conditions | Physiological Data |
|---|---|---|---|---|---|
| 2 | Significant fever | 10 minutes | 5 | 7 | Temp. ≥103° F |
| 5 | High blood pressure | 1 hour | 10 | NA | Systolic >180 mm Hg or Diastolic > 110 mm Hg |
| 7 | Vital signs decreasing | 1 minute | 1 | 2 | Temp. ≥106° F Glucose ≥240 mg/dl |

FIG. 4C

WIRELESS RELAY MODULE HAVING EMERGENCY CALL FUNCTIONALITY

RELATED APPLICATIONS

This application is a continuation-in-part of U.S. patent application Ser. No. 13/006,769, entitled "Wireless Relay Module for Remote Monitoring System" and filed on Jan. 14, 2011, and is related to U.S. Application Ser. No. 13/006,784, entitled "Medical Device Wireless Network Architectures" and filed Jan. 14, 2011, each of which shares an assignee-in-common with the present application and is incorporated by reference in its entirety herein for all purposes.

FIELD OF THE INVENTION

The present application is directed to networked communications between a series of medical devices and remote monitoring device via wireless relay networks and/or internet-accessible wireless communications networks having emergency call functionality and location positioning abilities.

BACKGROUND OF THE INVENTION

In critical care and home care health service centers including hospitals, clinics, assisted living centers and the like, care giver-patient interaction time is at a premium. Care givers are needed to respond rapidly to significant health conditions because any delay can represent the difference between life and death. Systems of centralized monitoring have been developed to more efficiently utilized care givers' time, by transmitting physiological data from each patient (or from graphically-dispersed critical care health service centers) to a centralized location.

At this centralized location, a single or small number of technicians monitor all of this patient information to determine patient status. Information indicating a patient alarm condition will cause the technicians and/or system to communicate with care givers to provide immediate patient attention, for example via wireless pagers and/or cell phones, and/or by making a facility-wide audio page.

The information transmitted to the centralized location could be performed over a local area network, such as with "WiFi" network based on IEEE 802.11 standards. The problem, however, with this network is that it is often difficult to secure sufficient local area network access for the purpose of providing centralized monitoring. Moreover, when a patient is located remotely from a critical care health service center (e.g., at home), access to traditional local area network facilities such as a WiFi network may be unavailable or not sufficiently reliable to support critical care monitoring applications.

An alternative to WiFi is ZIGBEE, which is based on the IEEE 802.15.4 standard for wireless personal area networks. ZIGBEE networks have previously been used for collecting information from a variety of medical devices in accordance with IEEE 11073 Device Specializations for point-of-care medical device communication, including for example pulse oximeters, blood pressure monitors, pulse monitors, weight scales and glucose meters.

The advantages of ZIGBEE networks are that the network is dynamically configurable (e.g., "self-healing" mesh configurations) and operates with low power requirements (e.g., enabling ZIGBEE transceivers to be integrally coupled to the medical devices under battery power). However, transmission ranges between individual ZIGBEE transceivers are generally limited to no more than several hundred feet. As a consequence, ZIGBEE networks are generally unusable for centralized monitoring locations located off-site.

The networks are not the only issue. In some cases the physiological data from each patient may relate to significant health conditions. However, sometimes the data may not be communicated fast enough to the local care givers because of delay and/or signal interference. Further, even if communicated to the care givers, they may not react quickly or still require outside assistance, such as emergency 911 responders.

SUMMARY OF THE INVENTION

The present invention is directed to wireless relay module and method of the same for enabling emergency call functionality in networked communications between a series of medical devices and remote monitoring device via wireless relay networks and/or internet-accessible wireless communications networks. The wireless relay module comprises a receiver capable of wirelessly receiving medical device data over a wireless relay network from at least one medical device along with a first transmitter capable of wirelessly transmitting medical device data to a second wireless relay module over the wireless relay network and a second transmitter capable of wirelessly transmitting data over an internet-accessible wireless communication network. The receiver and at least the first transmitter may preferably be implemented as a unitary transceiver. "Medical device data" and "data" as generally used herein means data from or about the medical device including, for example, medical device identification, medical device software, settings or status information (including alarm information and/or alarm priority), patient identification information, patient personal identification number(s) "PIN(s)", patient prescriptions, and/or patient medical and/or physiological data as is collected, produced and/or generated by the medical device.

A controller is coupled to the first and second transmitters, and controls the wireless relay module to select one of said first or second transmitter for transmitting medical device data received by the receiver over one of the two respective networks. The controller is further capable of establishing a connection using the first or second transmitter with an emergency responder when an emergency condition exists. For example, a phone device coupled to the controller initiates a connection with the emergency responder, and a signal generator coupled to the phone device produces a signal indicative of the emergency condition and transmitting the signal over the connection with the emergency responder.

Additionally, in one embodiment, the controller determines whether the emergency condition exists by comparing the medical device data to one or more emergency condition codes stored in a memory associated with the controller. In another embodiment, the medical device data received may itself include an indication that an emergency condition is present. Alternatively, the controller may determine whether the emergency condition exists based on a signal received or relayed from an internet-accessible source that detected such condition from received medical device data, or based on a signal from a wireless relay network source.

In the event that the controller receives an indication that a connection with the emergency responder cannot be established, the controller may transmit a non-response message to the one or more medical devices. The controller may also store in memory data representing the emergency condition and one or more of (a) a timestamp, (b) the one or more medical devices transmitting the emergency condition, and (c) a location of the one or more medical devices. The controller may transmit the stored data to a monitoring unit which identifies trends in the stored emergency conditions.

In a further embodiment, the controller detects device location information from the data transmitted by the one or more medical devices, and generates a location information signal that is transmitted by the first or second transmitter to the emergency responder. Alternatively, a stand-alone location device may generate a location signal, which may be based for example on a global positioning system signal or other location signal received by the relay module for transmission to the emergency responder.

BRIEF DESCRIPTION OF THE DRAWINGS

The invention will become more readily apparent from the Detailed Description of the Invention, which proceeds with reference to the drawings, in which:

FIG. 4c presents an exemplary table used to determine whether an emergency condition exists.

DETAILED DESCRIPTION OF THE INVENTION

Reference will now be made in detail to exemplary embodiments of the invention, including the best modes contemplated by the inventors for carrying out the invention. Examples of these exemplary embodiments are illustrated in the accompanying drawings. While the invention is described in conjunction with these embodiments, it will be understood that it is not intended to limit the invention to the described embodiments. Rather, the invention is also intended to cover alternatives, modifications, and equivalents as may be included within the spirit and scope of the invention as defined by the appended claims.

In the following description, specific details are set forth in order to provide a thorough understanding of the present invention. The present invention may be practiced without some or all of these specific details. In other instances, well-known aspects have not been described in detail in order not to unnecessarily obscure the present invention.

For the purpose of illustrating the present invention, exemplary embodiments are described with reference to FIGS. 1-5.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

Further described herein is a network architecture for centralized monitoring of medical devices using wireless relay networks and/or internet-accessible wireless communications networks having emergency call functionality to provide a secondary level of protection when significant health conditions occur. The architecture in addition enables the approximate location of the monitored medical devices to be determined.

Figure 1:
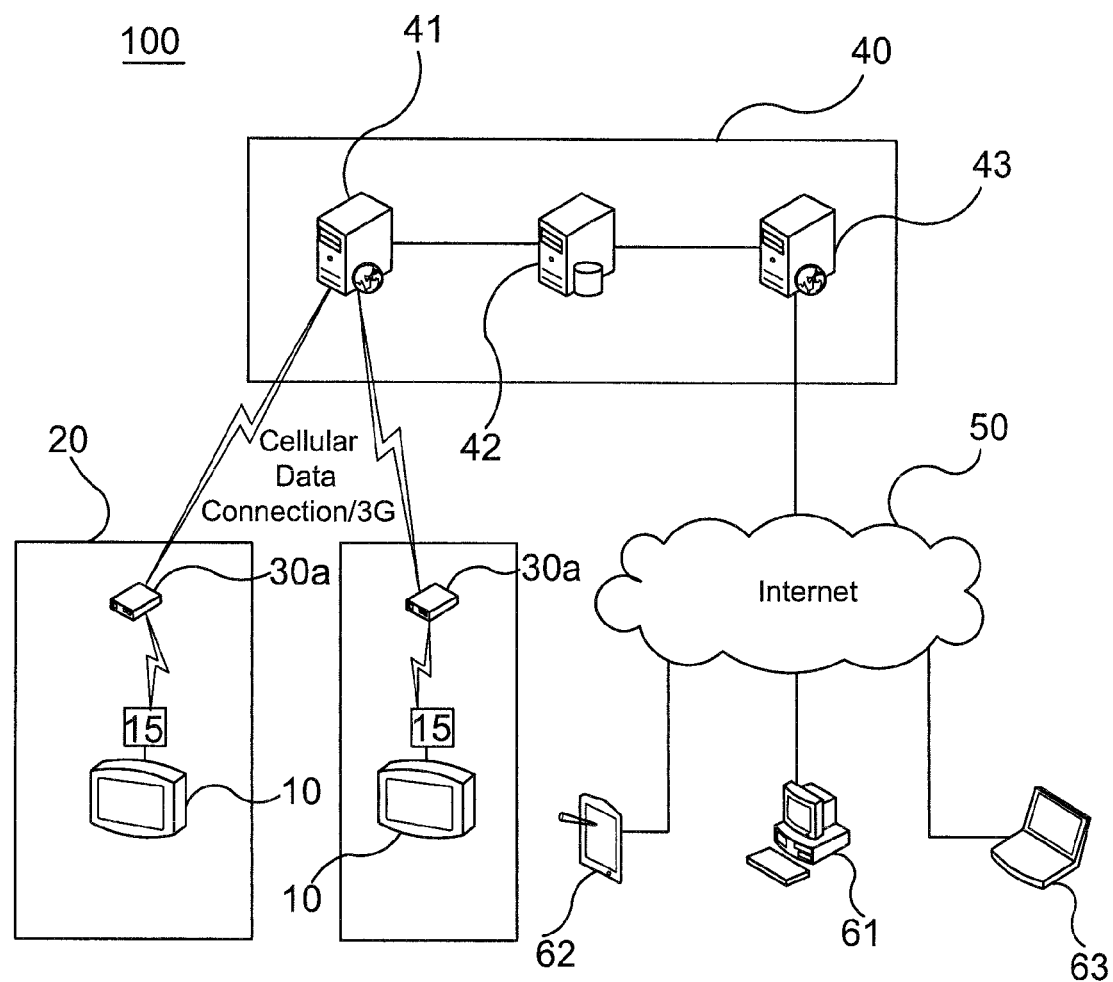
FIG. 1 present a schematic diagram of an exemplary architecture for a system for monitoring medical devices according to the present invention.

A schematic diagram of an exemplary architecture 100 for a system for monitoring medical devices in accordance with the present invention is illustrated in FIG. 1. One or more medical devices 10 are provided at a patient facility 20 for monitoring the medical condition and/or administering medical treatment to one or more patients. Patient facility 20 may comprise a critical care health service center (for example, including hospitals, clinics, assisted living centers and the like) servicing a number of patients, a home facility for servicing one or more patients, or a personal enclosure (for example, a backpack) that may be attached to or worn by an ambulatory patient. Associated with each medical device 10 is an interface circuit 15 that includes a transceiver for transmitting and receiving signals in a facility-oriented wireless network such as, for example, a Low-Rate Wireless Personal Area Networks or "LR-WPAN," ZIGBEE network or other low-power personal area networks such as the low power Bluetooth networks, e.g., Bluetooth 4.0, existing or presently under development or consideration for emulating a mesh network (such as ZIGBEE network) or otherwise. See, e.g., *ZIGBEE Wireless Sensor Applications for Health, Wellness and Fitness*, the ZIGBEE Alliance, March 2009, which is incorporated by reference herein in its entirety, for all purposes. See, also, Nick Hunn, *Essentials of Short-Range Wireless*, Cambridge University Press, 2010, which is also incorporated by reference herein in its entirety, for all purposes.

It should be understood that interface circuit 15 may be contained within or disposed external to medical device 10 in accordance with the present invention. Also provided within the patient facility 20 are one or more relay modules 30.

Figure 2:
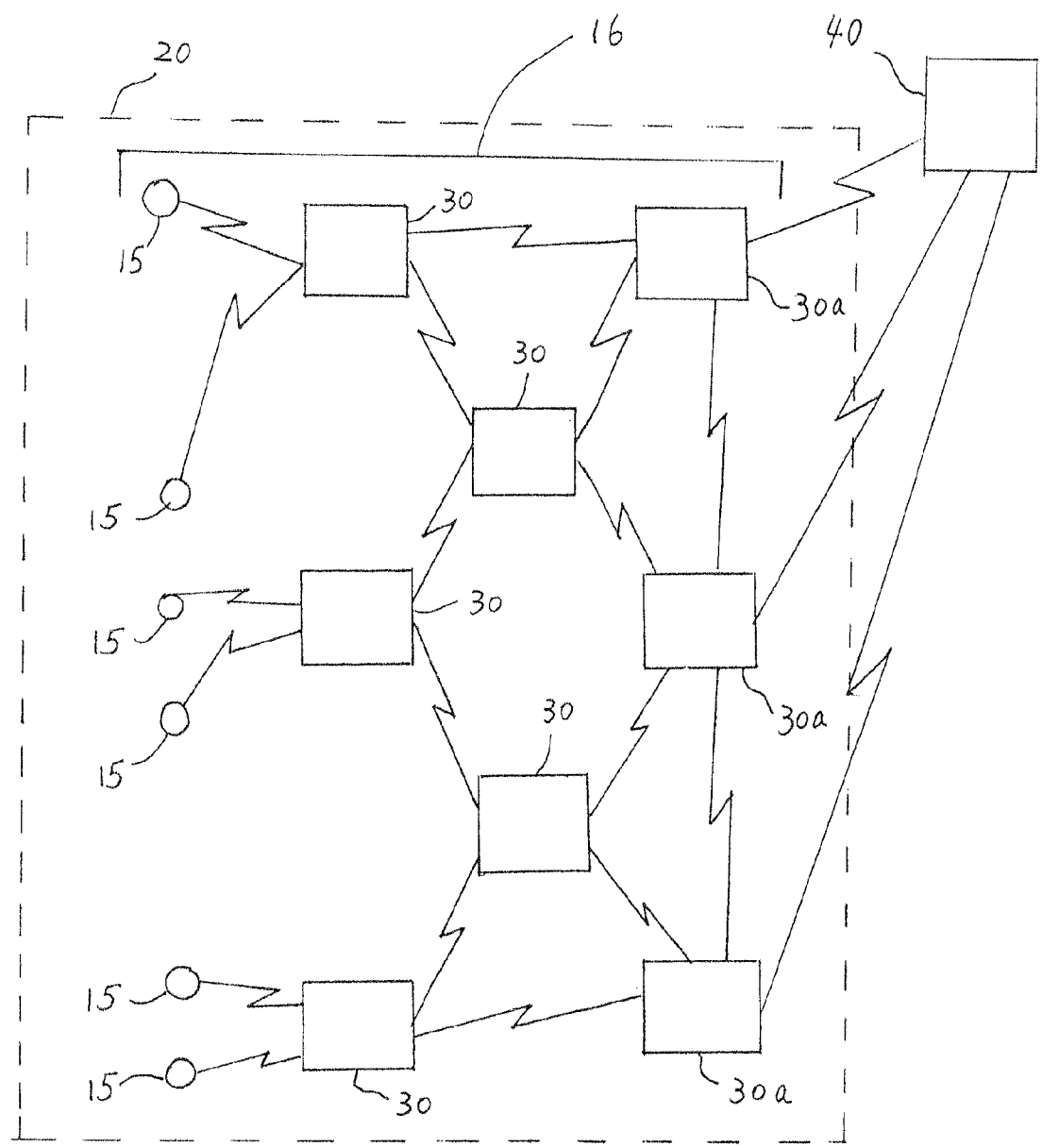
FIG. 2 presents a schematic diagram further illustrating exemplary wireless network components of the architecture according to FIG. 1.
Figure 3:
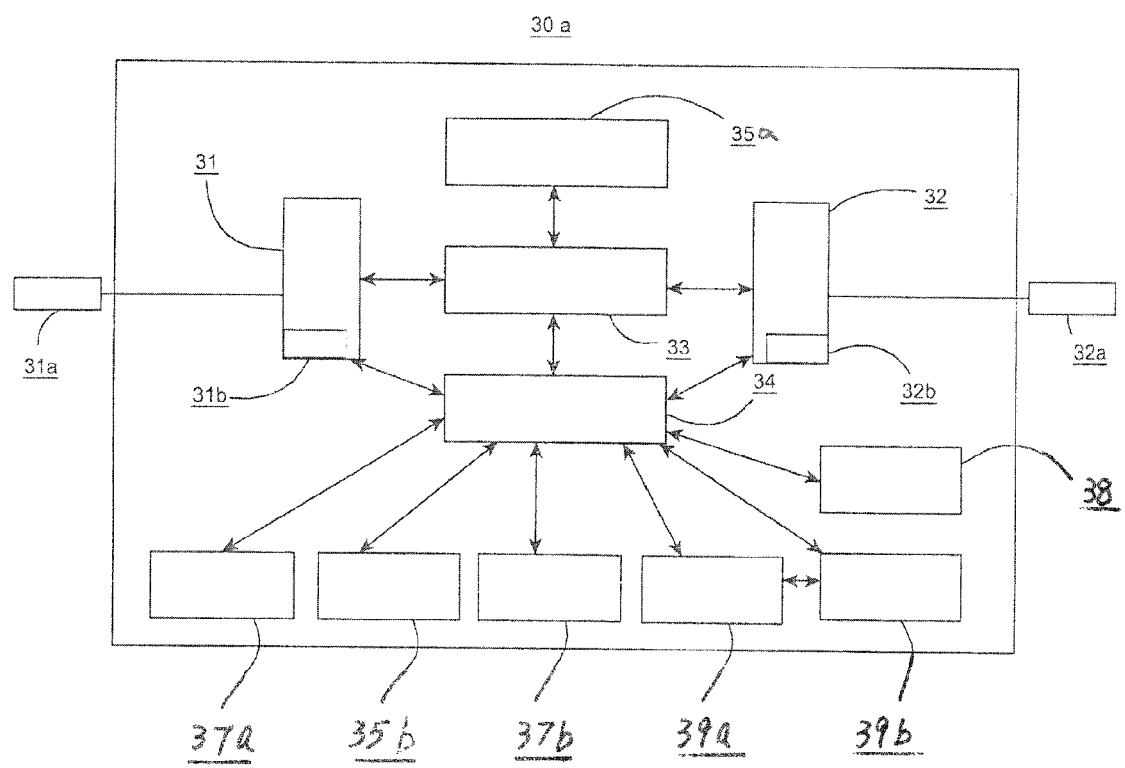
FIG. 3 presents a schematic diagram illustrating an exemplary wireless relay module associated with the architecture according to FIG. 1.

As will be described in greater detail with regard to FIG. 3, each relay module 30 of FIG. 2 includes a first transceiver 31 for receiving signals from and transmitting signals to the interface circuits 15 in the facility-oriented wireless network discussed above. Relay modules 30a as depicted in FIG. 3 correspond to relay modules 30, and further include a second transceiver 32 for wirelessly transmitting signals to and receiving signals from an access point 40 as shown in FIG. 2 via a wireless wide-area network or "WWAN". Suitable WWANs for use with the present invention include, for example, networks based on a Global System for Mobile Communications (GSM) or Code Division Multiple Access (CDMA) cellular network or associated with the 2G, 3G, 3G Long Term Evolution, 4G, WiMAX cellular wireless standards of ther International Telecommunication Union-Radiocommunication Sector (ITU-R). For compliance with Health Insurance Portability and Accountability Act of 1996 (HIPAA) regulations, communications over each of the facility-oriented wireless network and WWAN are preferably conducted securely using, for example, using a Secure Sockets Layer (SSL) protocol or a Transport Layer Security (TLS) protocol.

As illustrated in FIG. 1, a suitable access point 40 useable with the present invention may include an inbound web server 41 that incorporates or otherwise has access to a transceiver for communicating with the relay modules 30a over the WWAN. Medical device data received by the inbound web server 41 over the WWAN is forwarded to a secure data storage server 42, which is configured for example to log the received data in association with identification information of the associated medical devices. As was previously described infra, "medical device data" and "data" as generally used herein means data from or about the medical device including, for example, medical device identification, medical device software, medical device settings or status information (including alarm information and/or alarm priority), patient identification information, patient personal identification number(s) "PIN(s)", patient prescriptions, and/or patient medical and/or physiological data as is collected, produced and/or generated by the medical device.

An outbound web server 43 is configured, for example, to receive and qualify data retrieval requests submitted by one or more of remote monitoring devices 61, 62 and 63 over a broad-band network 50 (for example, over the Internet), to request associated medical device data to be retrieved from the secure data storage server 42, and to format and transmit the retrieved data to the one or more remote monitoring devices 61, 62 and 63 for display on associated device displays. While this disclosed architecture for the access point 40 is illustrated with an exemplary embodiment of the present invention, it should be understood that any architecture for the access point 40 that enables the receipt, storage and retrieval of medical device data on a device display of the one or more remote monitoring devices 61, 62 and 63 is intended to be included within the scope of the present invention.

FIG. 2 presents a block diagram that further illustrates exemplary components of the inventive architecture that are located within or otherwise associated with the patient facility 20 of FIG. 1. In FIG. 2, a number of interface circuits 15 and relay modules 30, 30a are arranged in a mesh network 16 within the patient facility 20. The interface circuits 15 and relay modules 30, 30a are configured to communicate with one another via associated wireless links. In a preferred embodiment of the present invention represented in FIG. 2, the network 16 is a ZIGBEE mesh network based on IEEE 802.15.4. However, the network 16 may be organized according to a variety of other wireless local area network (WLAN) or WPAN formats including, for example, WiFi WLANs based on IEEE 802.11 and Bluetooth WPANs based on IEEE 802.15.1.

In the illustrated ZIGBEE mesh network 16, each of the interface circuits 15 includes a communications interface such as, for example, a wired communications interface, to an associated medical device 10 as shown in FIG. 1. In addition, each of the relay modules 30, 30a includes at least one transceiver configured to communicate with other relay modules 30, 30a in the ZIGBEE mesh network 16. Relay modules 30a further include at least a second transceiver for communicating over the WWAN with the access point 40.

The ZIGBEE mesh network 16 provides the advantages of being self-configurable when one or more interface circuits 15 and/or relay modules 30, 30a are added to the network, and self-healing when one or more interface circuits 15 and/or relay modules 30, 30a are removed from or otherwise disabled in the network. Sub-groupings of the interface circuits 15 and relay modules 30, 30a may be provided in a defined geographic space (for example, on an individual floor or within a region of a floor in a multi-floor home or care facility).

FIG. 3 provides a block diagram illustrating exemplary components of relay module 30a. In FIG. 3, the relay module 30a includes a first transceiver 31 for wirelessly communicating with interface circuits 15 and other relay modules 30, 30a in the WLAN or WPAN network 16 of FIG. 2 via an antenna 31a. The relay module 30a further includes a second transceiver 32 for wirelessly communicating with the access point 40 over the WWAN via an antenna 32a. Each of the transceivers 31, 32 is in communication with a data processing circuit 33, which is configured to operate under the control of a processor 34 to accept data received by the transceivers 31, 32 and store the received data in a buffer element 35a.

According to an embodiment of the present invention, the processor 34 is configured to determine whether the received medical device data indicates an emergency condition. This determination may be performed by the processor 34 in a number of ways. For example, the processor 34 may compare a condition code in the received medical device data to a condition table located in memory 35b that, for example, includes one or more of corresponding codes for the emergency condition, a description of the emergency condition, symptoms of the emergency condition, an estimate of a future time at which the emergency condition may become harmful (or emergency condition harm time), rankings and/or weights for the emergency condition, related emergency conditions, physiological data (e.g., vital signs, blood pressure, pulse oximetry, ECG, temperature, glucose levels, respiration rate, weight, etc.) indicative of the medical condition, and so on. One form of the possible table is described with reference to FIG. 4c.

The data in the condition table may be initially entered and/or periodically refreshed from a master store or central repository of emergency condition data, for example, maintained by a designated relay module 30, 30a or other device accessible over one of the available networks. Associated emergency condition data may be periodically transmitted on a scheduled or as-needed basis, for example, from the access point 40 to each of the relay modules 30, 30a. Additionally, polling may be carried out, for example, by the central repository to determine whether any of the relay modules has been provided with emergency condition data not available in the central repository. This emergency condition data may then periodically be transmitted to the central repository, and the central repository may in turn transmit the data to the other modules that may be missing such data. In this way, the exchange of information between the central repository and the relay modules is bidirectional, thus ensuring all modules and the central repository are synchronized with the same emergency condition data. To avoid conflicts, emergency condition data may be time stamped or provided with another indicator of data currency. If a central repository is not used, the modules may exchange emergency condition information between themselves to ensure each module is synchronized. Other embodiments are possible, for example, using multiple central repositories according to conditions monitored, geographic location, and the like.

According to one embodiment, the rankings and/or weights may be applied by the processor 34 to assign priority to different emergency conditions and/or perform a triage. For example, the processor 34 on receipt of multiple pieces of medical device data from different transceivers located in the same geographic location or a number of different geographic locations could determine that one medical device requires more immediate medical attention than the others. The priority analysis may also be performed, for example, using the emergency condition harm times.

In one embodiment, it is possible that the medical device data analyzed by the processor 34 may not match any of the emergency conditions in the table and/or database because there is a misspelling and/or the medical condition is known by other names and/or represents a new medical condition. In this scenario, the processor 34 may, for example, perform a similarity analysis between the medical device data received and the symptoms and/or physiological data in the table and/ or database (see, e.g., the disclosure herein supra in reference to FIG. 4c). Based on this similarity analysis, the processor 34 may select, if any, the emergency condition that closely approximates the medical device data. Also, the processor 34 may in addition or alternatively log the medical device data to a database and/or file to allow administrators to determine why the emergency condition did not match an exact emergency condition in the table and/or database.

According to another embodiment, in order to make processing more efficient, the processor 34 may compare the medical device data received at the transceiver to a list of prior determined emergency conditions and determine if there is a match or approximate match based on conventional interpolation and/or extrapolation techniques. In another embodiment, the processor 34 may also parse the medical device data to find a code which indicates that an emergency condition exists. Alternatively, the processor 34 may search a table and/or database located in a central repository as mentioned above to determine if the medical device data received indicates an emergency condition. In a another embodiment, the processor 34 in one relay module 30a may query a processor 34 in another device (not the central repository) to determine if that other device knows whether the medical device data includes emergency condition data representing an emergency condition.

Once an emergency condition is determined and an alarm condition is activated by the processor 34 of the relay module 30a, a message may be transmitted to an access point 40 by the relay module 30a (as shown in FIGS. 1 and 2), where the message is parsed to determine if alarms should be activated. The alarms could be anything from certain signals to care givers associated with the one or more medical devices which originated the alarms or alerting emergency responders.

A monitoring unit 37b may also be associated with the processor 34, and responsible for identifying trends in emergency conditions. The monitoring unit 37b may store the emergency conditions data received, the date/time, an identity of the medical device which provided the data, the location of the medical device, and so on. Using the emergency condition data and/or additional medical device data, the monitoring unit 37b may analyze the data for trends. This trend information may be used, for example, to determine whether one or more medical devices should be monitored. In addition, the trend information may be communicated to one or more devices (for example, PDAs, cell phones, pager, tablets, and the like) associated with relatives, friends, or care givers and the like, who may use the knowledge to provide more efficient care.

Upon making a determination that an emergency condition exists, the processor 34 may transmit a message to a phone device 39a (discussed below) to activate it and also initiate a connection (e.g., phone call, etc.) with an emergency responder, such as 911, relatives/friends, care givers, or police authorities, and the like. When a call is received by the emergency responder, an automated voice message may be transmitted to the emergency responder as a prerecorded message stored in a signal generator 39b (which is coupled to the phone device 39a and the processor 34). Preferably, the prerecorded message identifies an associated medical condition along with the location of the medical device. Alternatively, the signal generator 39b may generate a dynamic speech signal that contains the determined emergency condition and other information The prerecorded or dynamic message described above may in addition include other relevant patient data to further allow the emergency responders to assess the situation. For example, a patient table stored at the relay module (or alternatively/in addition at the centralized location) may identify care givers of the patient, other present conditions of the patient, previous medical history (e.g., allergic to certain drugs, such as morphine), and additional relevant patient information. Preferably, storage and use of the data in the patient table would conform to HIPAA requirements. As an alternative to these voice messages, the signal generator 39b may transmit medical condition information in the form of a text message to the emergency responder. For example, a text message may be sent over one of a Short Message Service (also known as "SMS") and/or Multimedia Messaging Service (also know as "MMS").

The phone device 39a above could be connected via one or more of wireless relay network or internet-accessible wireless network to initiate the call over a voice over internet protocol (VoIP) network, a Public Switched Telephone Network (PSTN), or the like.

The call to the emergency responders may be unsuccessful for a variety of reasons (for example, associated E911 circuits may be busy or otherwise unavailable). In this situation, the processor 34 and/or phone device 39a may detect a non-response from the E911 circuits and transmit a non-response message to one or more of the medical device, the access point 40, and/or one or more other designated devices to indicate the unsuccessful call. In addition, the processor 34 may periodically perform self-diagnostics on the relay module 30a to confirm that each of the components of the modules 30a that is used to detect the emergency condition and make the emergency call is operational Of course while a single processor 34 is described, multiple processors 34 may be used in as appropriate.

The location of the medical device may determined in a variety of ways well-known in the art. For example, location information may be provided to the processor 34 from a global positioning system signal ("GPS") that is received and interpreted by the medical device located in the medical device data received, a GPS chip in the location device 38, and/or location algorithm in the location device 38 discussed further below. In another embodiment, (e.g., location) as discussed above.

As discussed above, location information may be included in the medical condition data received by one of the relay modules 30, 30a to identify the location of the one or medical devices 10. Alternatively, the relay modules' location may also be determined using a conventional GPS receiver provided in the location device 38. In the latter case, at least an approximate or "zone" location of the one or more medical devices would be provided by the location information for the relay module 30a.

As an alternative to GPS-based location, each of the relay modules 30a may for example transmit and receive signals via the internet-accessible wireless communication network to two or more cell towers, beacons or other radio devices at fixed, known locations in order to determine a location of the relay module according to known geometric methods. Such techniques for determining location (for example, including triangulation form cell towers) are well known in the art. See, e.g., Shu Wang et at *Location-Based Technologies for Mobiles: Technologies and Standards*, presentation at IEEE ICC Beijing 2008, IEEE, 2008, which is incorporated by reference herein in its entirety, for all purposes. In one embodiment of the present invention, triangulation may be carried out using other relay modules positioned at fixed, known locations in a facility.

Turning back to the data processing circuit 33, it is further configured to retrieve data from the buffer element 35a under the direction of the processor 34 and provide the retrieved data to a selected one of the transceiver 31 or transceiver 32 for transmission. In order to make a selection, the processor 34 is configured to communicate with respective status modules 31b, 32b of the transceivers 31, 32 in order to determine a communications status of each of the transceivers 31, 32.

The processor 34 is also preferably in communication with an input/output circuit 37a, which provides signals to one or more display elements (not shown) of the relay module 30a, for example, for indicating a start-up or current status of the relay module 30a, including communication or connection status with the WLAN or WPAN network 16 and WWAN. The input/output circuit 37a may also be connected to user buttons, dials or input mechanisms and devices of module 30a. The input/output circuit 37a is further usable for providing alarm signals to indicate, for example, A/C power loss or loss of accessibility to the WWAN or wireless relay network.

Relay module 30a may preferably be provided as a small physical enclosure (not shown) with an integral power plug and power supply circuit, such that the relay module 30a may be directly plugged into and supported by a conventional wall outlet providing commercial A/C power. Relay module 30a may also preferably include a battery back-up circuit (not shown) to provide uninterrupted power in the event of A/C power outage as well as for ambulatory use of the relay module. Alternatively, relay module 30a may be provided with rechargeable and/or replaceable battery power as a primary power source for ambulatory use. It should be readily understood by one skilled in the art that processor 34 and devices 37a-39b are shown as separate and distinct devices in FIG. 3 for illustration purposes only and that the functionality of devices 34 and 37a-39b may be combined into a single or larger or smaller number of devices than exemplarily illustrated in FIG. 3.

Figure 4:
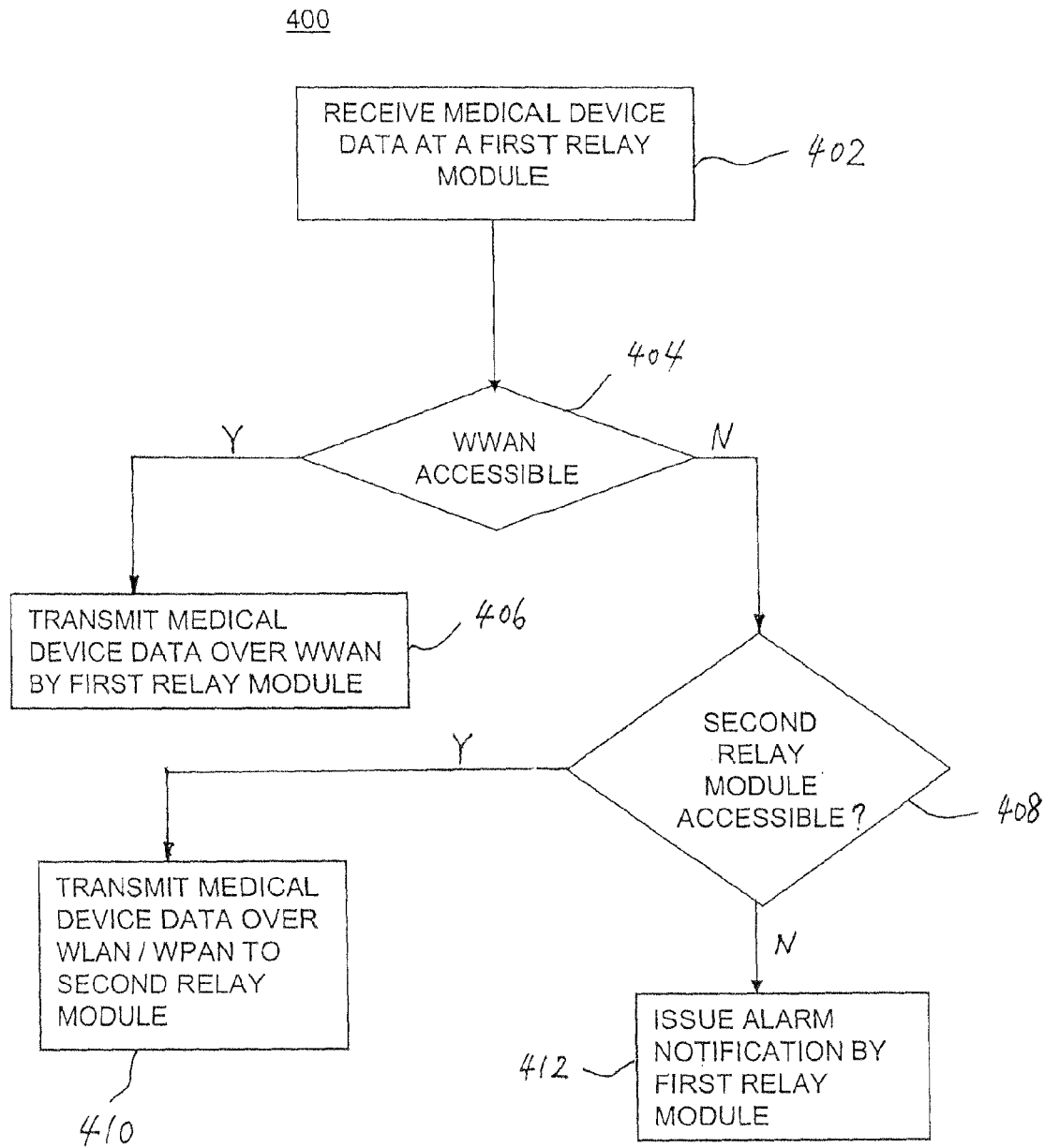
FIG. 4 presents a flow diagram illustrating a first exemplary method of operation for the architecture according to FIG. 1.

FIG. 4 presents a flow diagram illustrating an exemplary method of operation 400 for the architecture according to FIG. 1 and relay module 30, 30a components of FIGS. 2, 3, relating to the transmission of medical device data obtained from a medical device 10 to the access point 40. At step 402 of the method 400, the medical device data is received at a first one of the relay modules 30, 30a from one of the interface circuits 15 and/or other relay modules 30, 30a over the ZIGBEE mesh network 16. At step 404, the processor 34 of the one relay module 30a determines whether the WWAN is accessible by that relay module 30a.

The determination of step 404 may be carried out in a variety of manners. For example, the processor 34 may interrogate the status module 32b of the transceiver 32 at the time of the receipt of the medical device data to determine a status of access for the transceiver 32 to the WWAN (for example, as the result of the transceiver 32 detecting an access signal of the WWAN having adequate signal strength). Alternatively, the processor 34 may interrogate the status module 32b at a different time including, for example, at system start-up and/or periodically (for example, hourly), and maintain a status indicator such as in the buffer 35a or another storage element to be retrieved at the time of receipt of the medical device data. In another alternative, the relay module 30, 30a may be assigned a predetermined, fixed role within the network 16. For example, relay modules 30a in the network 16 may be assigned a data routing assignments by a controller or "master" relay module pre-selected from among the relay modules 30, 30a. By definition, the WWAN status for relay module 30 that does not possess WWAN access capability shall have a fixed status of "WWAN inaccessible."

If, as provided for in step 404, the status module 32b indicates that the WWAN is accessible by the transceiver 32, then the processor 34 will proceed to step 406 to instruct the data processing circuit 33 of the one relay module 30 to retrieve the medical device data from the buffer 35a (as necessary) and forward the medical device data to the transceiver 32 for transmission to the access point 40 over the WWAN.

Alternatively, in step 404, the status module 32b may indicate that the WWAN is not accessible by the transceiver 32. For example, if the one relay module 30a is located on a basement floor of the building in an area that is substantially shielded with respect to WWAN signals, the WWAN may not be accessible to the one relay module 30a. In this event, at step 408, the processor 34 determines whether a second relay module 30a is accessible via the WLAN or WPAN. Again, this determination may be made in a variety of manners including by instructing the transceiver 31 to send a handshake signal transmission directed to a second relay module 30a and to listen for a reply, or by retrieving a stored status indicator for the second relay module 30a.

If the second relay module 30a is accessible, then the processor 34 instructs the data processing circuit 33 of the one relay module 30a to retrieve the medical device data from the buffer 35a (as necessary) and forward the medical device data to the transceiver 31 for transmission to the second relay module 30a over the WLAN or WPAN at step 410. Alternatively, if the second relay module 30a is inaccessible in step 408, this portion of the process 400 may preferably be repeated to search for a further relay module 30a that is accessible. Alternatively, or in the event that no other relay module 30a is available, the processor 34 of the one relay module 30a may preferably issue an alarm notification at step 412. Such an alarm notification may, for example, include one or more of local visual and audio alarms as directed by processor 34 via the input/output circuit 37a of the one relay module 30a, alarm messages directed by the processor 34 to another accessible WPAN, WLAN or WWAN via one or more of the transceivers 31, 32, and/or alarm messages generated by the inbound web server 41 of the access point 40 of FIG. 1 after a specified time period has been exceeded during which a handshake signal of the relay module 30a is due to be received at the inbound web server 41.

Figure 4A:
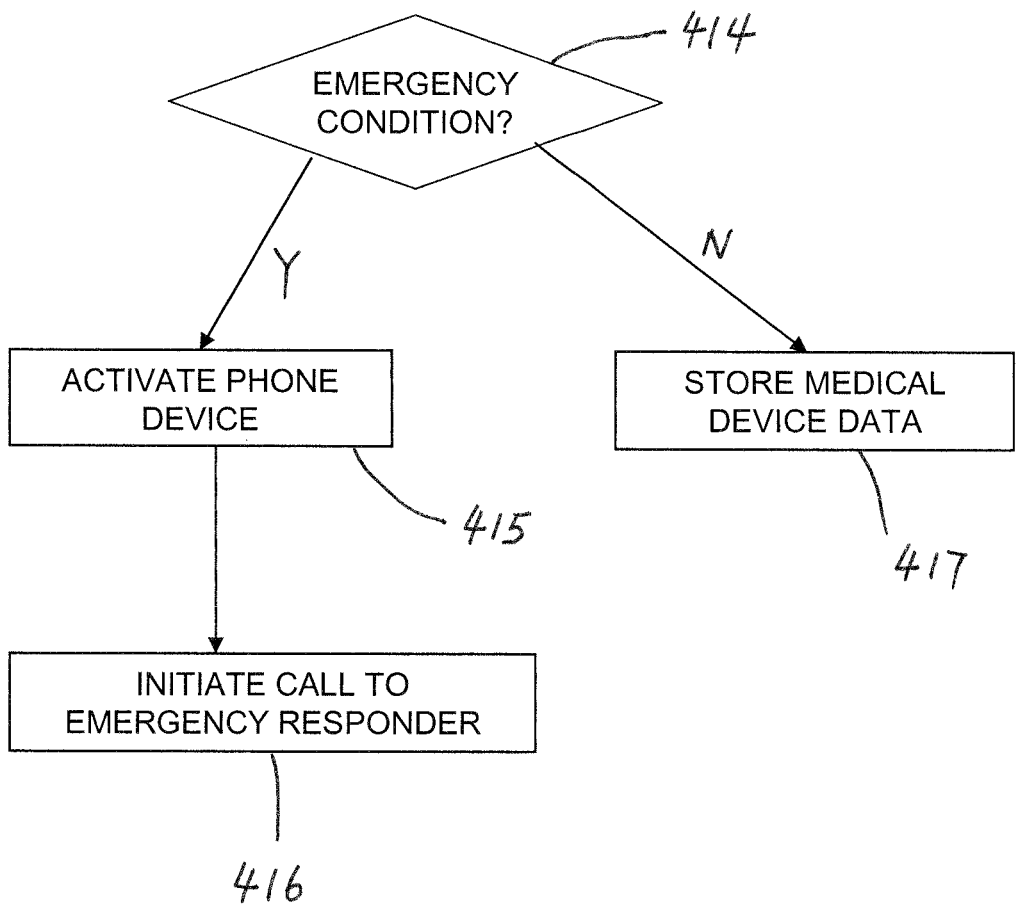
FIG. 4a presents a flow diagram illustrating an exemplary emergency call system.

FIG. 4a presents a flow diagram 413 illustrating an exemplary method of operation for emergency dialing. In accordance with the flow diagram 413, the processor 34 of the relay module 30a of FIG. 3 determines whether to transmit over the facility-oriented wireless network or the WWAN and makes a determination based on the medical device data whether an emergency condition exists as represented by step 414. If such a condition exists then, in step 415, the processor 34 transmits a message to the phone device 39a to activate it and also initiate a connection in step 416 (e.g., phone call, etc.) with an emergency responder, such as 911, relatives/friends, care givers, or police authorities. When the call is received by the emergency responder, an automated voice message is preferably transmitted to the emergency responder by the signal generator 39b indicating the emergency condition and location of the condition. If an emergency condition does not exist in step 414, in step 417 then the medical device data is stored for further analysis by the monitoring unit 37b.

Figure 4B:
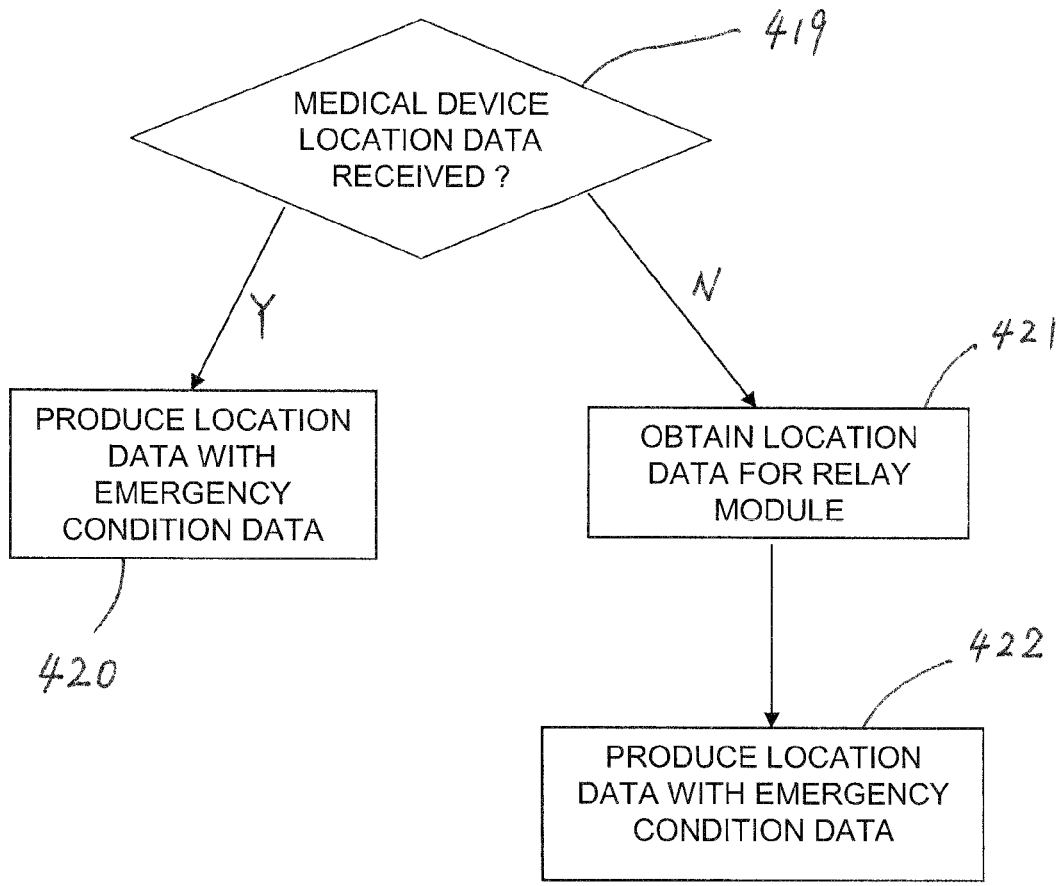
FIG. 4b presents a flow diagram illustrating an exemplary generation of a location signal.

FIG. 4b presents an exemplary flow diagram 418 illustrating how a location signal may be generated. A determination is made in step 419 by the processor 34 as to whether GPS location data was received as a component of the medical device data received from a medical device. If yes, in step 420, the processor 34 provides the location data for transmission with emergency condition data to the emergency responder. If that location data is not available, at step 421a location device 38 of the relay module 30a is instructed by the processor 34 to generate location data of the relay module 30a. At step 422, the processor 34 provides the location data for transmission with emergency condition data to the emergency responder as a component of the message transmitted by the phone device 39a.

FIG. 4c presents an exemplary table as may be stored for example in memory 35b by the relay module 30a for determining whether an emergency condition exists. As illustrated, the table 423 includes codes 424 to indicate predetermined emergency conditions, descriptions 425 for the emergency conditions, harm times 426 defining an elapsed time until the emergency condition becomes harmful, priorities 427 for triage purposes, related codes 428 to the coded emergency condition, and physiological data 429 used to identify the emergency condition. For example, as shown in line 1 of the exemplary table of FIG. 4c, a code value 424 of "2" is assigned to the description 425 "Significant fever condition," which is assigned an unattended harm time 426 of "10 minutes" and an immediate priority of 427 of "5." A related condition 428 indicates that this condition in related to a code value 424 of "7," which corresponds to the description 425 "Vital signs decreasing." The code value 2 in addition corresponds to physiological conditions 429 ("Temp.≥ 103").

Figure 5:
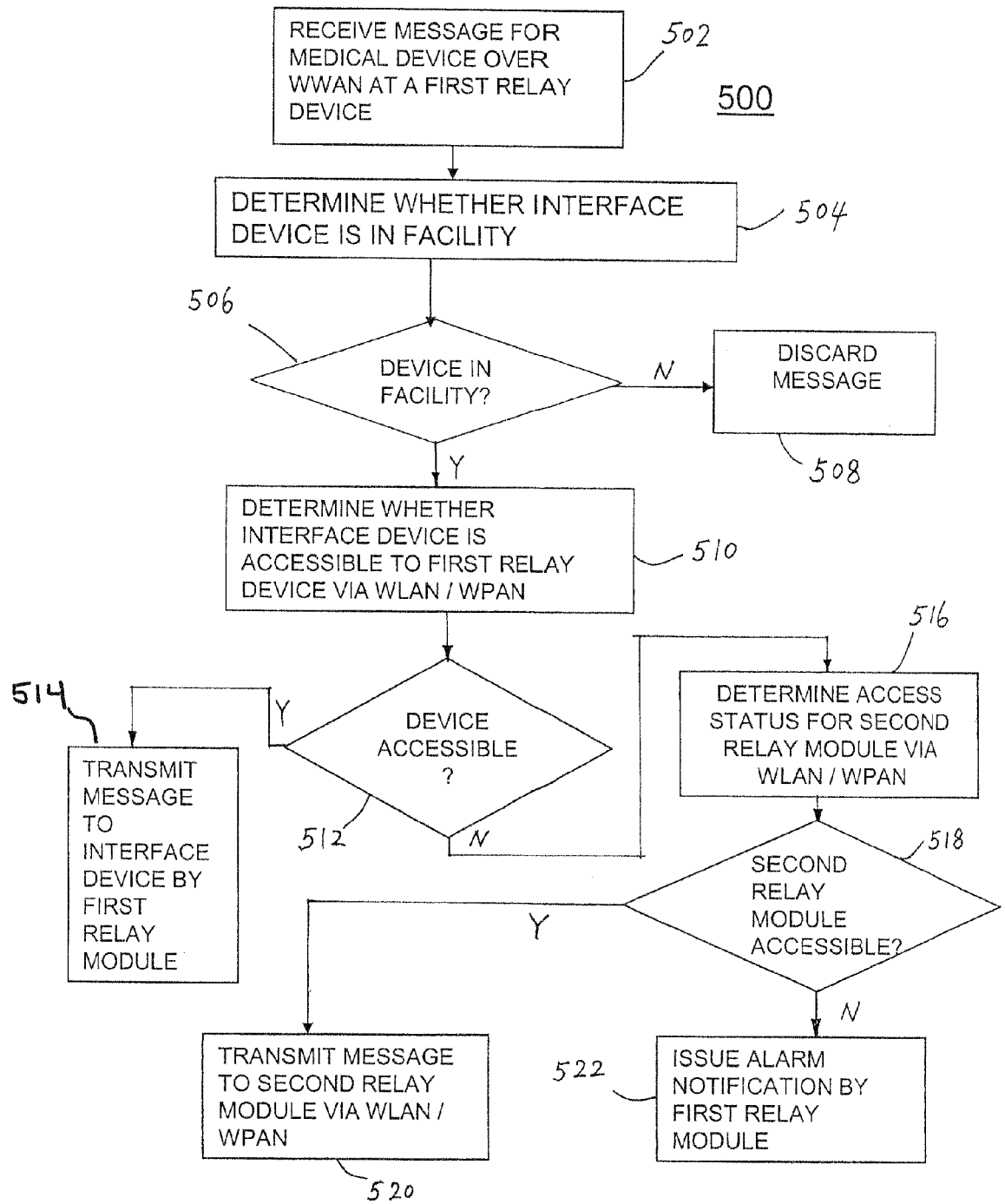
FIG. 5 presents a flow diagram illustrating a second exemplary method of operation for the architecture according to FIG. 1.

FIG. 5 presents a flow diagram illustrating another exemplary method of operation 500 for the architecture according to FIG. 1, relating to the transmission of a message from the access point 40 to be received by one of the medical devices 10. This enables the access point 40, for example, to communicate with medical devices in order to download new firmware or software, to respond to error messages initiated by the medical devices, for example, to re-set a device or remove it from service, or to run device diagnostics, and to operate the medical device for example, to adjust a flow rate on a feeding pump.

At step 502 of the method 500, the message is received at the first one of the relay modules 30a from the access point 40 via the WWAN. At step 504, the one relay module 30a determines whether the message is intended to reach one of the interface circuits 15 and/or other relay modules 30, 30a located in the facility 20. This may be accomplished, for example, by maintaining a list of active devices 15 and modules 30, 30a in the buffer 35a or in a manner otherwise accessible to the one relay module 30a, or coding an identifier of the interface circuit 15 or module 30, 30a to include an identity of the facility 20 that is stored in the buffer 35a or is otherwise identifiable to the one relay module 30a. In the alternative, the received message may include a device identifier such as a serial number or an assigned identifier. Such a received message would then be broadcasted to all or a subset of interface circuits 15 in the facility and each interface circuit 15 determines if it was the intended recipient and should act upon or ignore the message.

If the one relay module 30a determines at step 506 that the interface circuit 15 or module 30, 30a is not located in the facility, the one relay module 30a may preferably proceed to discard the message at step 508, and/or alternatively alert the access point 40 with a non-delivery message. If the interface circuit 15 is located in the facility 20, the one relay module 30a determines at step 510 whether the interface circuit 15 or relay module 30, 30a is accessible to the one relay device 30 via the WLAN or WPAN (for example, by consulting a list stored in the buffer 35a or that is otherwise accessible to the one relay module 30, or by instructing the transceiver 31 to send a handshake or test transmission directed to the interface circuit 15 and to listen for a reply).

If the one relay module 30a determines at step 512 that the device 15 or relay module 30, 30a is accessible, then at step 514, it transmits the message via network 16 to that device or relay module via the transceiver 31. If the one relay module 30a alternatively determines at step 512 that the device or relay module is not accessible, it proceeds at step 516 to determine whether a second relay module 30, 30a is accessible via the WLAN or WPAN (for example, by instructing the transceiver 31 to send a handshake or test transmission directed to the second relay module and to listen for a reply). If the second relay module 30, 30a is available, then the one relay module 30 forwards the message to the transceiver 31 for transmission to the second relay module 30, 30a over the WLAN or WPAN. If the second relay module 30, 30a is inaccessible, then this portion of the process 500 may preferably be repeated to search for a third relay module 30, 30a that is accessible. Alternatively, or in the event that no other relay module 30, 30a is available, the one relay module 30 may preferably issue an alarm notification at step 522, preferably in one of the same manners described above in reference to the method 400 of FIG. 4.

The novel architecture disclosed herein for providing networked communications between a series of medical devices and a remote monitoring device provides a number of distinct advantages in comparison to other monitoring systems. By employing ZIGBEE networks based on the IEEE 802.15.4 standard according to a preferred embodiment for wireless communications between the medical devices 10 and relay modules 30, 30a, power and size requirements can be minimized so that the interface circuits 15 can be easily and inexpensively applied to and/or integrated with the medical devices 10.

By introducing relay modules 30a that are part of the ZIGBEE networks and are directly able to access off-site monitoring devices via a WWAN, access to and reliance on existing and potentially unreliable LAN facilities at a facility can be avoided. By incorporating relay features into the relay modules 30a that relay communications from a first relay module 30, 30a to a second relay module 30a in the event that WWAN access to the first relay module 30a has been compromised, the present invention improves reliability and enables the use of conventional, low-cost cellular transceivers in the relay modules 30a for accessing the WWAN.

By limiting the configuration of cellular transceivers to just the relay modules 30a, costs can be further reduced. In addition, providing the relay modules 30a in a compact enclosure facilitates the relay modules 30a to be easily connected to reliable commercial power sources and easily moved when needed to reconfigure the ZIGBEE networks according to facilities changes.

It should of course, be understood that while the present invention has been described with respect to disclosed embodiments, numerous variations are possible without departing from the spirit and scope of the present invention as defined in the claims. For example, the present invention may be based on any of a number of current and future WPAN, WLAN and WWAN standards beyond those explicitly described herein. It should also be understood that it is possible to use exclusively relay modules 30 in the WLAN or WPAN network 16 of FIGS. 1 and 2, with transceivers for communicating with other relay modules as well as over the WWAN.

In addition, respective interface circuits useable with the present invention may include components of and perform the functions of the modules 30, 30a to provide greater flexibility in accordance with the present invention. Further, numerous configurations of components for relay module 30 are useable with the present invention beyond the components shown in FIG. 3. For instance, an input-output buffer may be used with respective switches under control of a processor for directing medical device data to transceivers 31, 32 as needed. Moreover, it is intended that the scope of the present invention include all other foreseeable equivalents to the elements and structures as described herein and with reference to the drawing figures. Accordingly, the invention is to be limited only by the scope of the claims and their equivalents.

We claim:

1. A wireless relay module comprising:
   a receiver capable of wirelessly receiving medical device data over a wireless relay network from at least one medical device;
   a first transmitter capable of wirelessly transmitting medical device data to a second wireless relay module over the wireless relay network;
   a second transmitter capable of wirelessly transmitting the medical device data over an internet-accessible wireless communication network;
   a controller coupled to the first and second transmitters, the controller capable of controlling the wireless relay module to select one of said first or said second transmitter for transmitting the medical device data received by the receiver and the controller capable of establishing a connection via the first or second transmitter with an emergency responder when an emergency condition exists;
   a phone device coupled to the controller, the phone device capable of initiating the connection with the emergency responder; and
   a signal generator coupled to the phone device, the signal generator capable of producing a signal indicative of the emergency condition for transmission over the connection with the emergency responder.

2. The wireless relay module of claim 1, wherein the controller is capable of determining whether the emergency condition exists based on comparing the medical device data to emergency condition data stored in a memory associated with the controller.

3. The wireless relay module of claim 1, wherein the medical device data includes emergency condition data indicating that an emergency condition is present.

4. The wireless relay module of claim 1, wherein the controller is capable of determining whether the emergency condition exists based on emergency condition data received or relayed from an internet-accessible source.

5. The wireless relay module of claim 1, wherein the controller is capable of determining whether the emergency condition exists based on emergency condition data received by the receiver from a wireless relay network source.

6. The wireless relay module of claim 1, wherein the controller is capable of controlling at least one of the first transmitter or the second transmitter to transmit a message containing information about the emergency condition to a remote location.

7. The wireless relay module of claim 1, wherein the controller is further capable of determining that the connection with the emergency responder is not established and controlling at least one of the first transmitter or the second transmitter to transmit a non-response message.

8. The wireless relay module of claim 1 further comprising:
   a memory for storing emergency condition data representing the emergency condition and one or more of a timestamp, an identifier for each of the one or more medical devices transmitting the emergency condition, a location of the one or more medical devices; and
   a monitoring unit associated with the controller for analyzing the data stored in the memory to identify trends in the stored emergency conditions.

9. The wireless relay module of claim 1, wherein the signal generator is configured to generate an electronic text message containing information about the emergency condition to be transmitted to the emergency responder.

10. The wireless relay network of claim 1, wherein the medical device data comprises a serial number used to uniquely identify the wireless relay module.

11. The wireless relay network of claim 1, wherein the receiver and at least one of the first transmitter and the second transmitter are implemented as a transceiver device.

12. A computerized method comprising the steps of:
    receiving medical device data at a wireless relay module wirelessly transmitted from one or more medical devices;
    determining at the wireless relay module that at least a portion of the received data is indicative of an emergency condition;
    generating an emergency signal at the wireless relay module indicative of the emergency condition;
    selecting by the wireless relay module one of a first transmitter capable of transmitting the emergency signal over a wireless relay network and a second transmitter capable of transmitting the emergency signal over an internet-accessible wireless communication network;
    establishing a wireless connection with an emergency responder by the selected one of the first transmitter or the second transmitter; and
    transmitting the generated emergency signal to the emergency responder by the selected one of the first transmitter or the second transmitter.

13. The method of claim 12, wherein the determining step further comprises the step of comparing the received data to emergency condition data stored in the wireless relay module to determine whether an emergency condition exists.

14. The method of claim 12, wherein the received medical device data includes the emergency condition data indicating that an emergency condition is present.

15. The method of claim 12, wherein the determining step further comprises the step of receiving emergency condition data via the internet-accessible wireless communication network to determine whether the data is indicative of an emergency condition.

16. The method of claim 12, wherein the determining step comprises receiving emergency condition data from a wireless relay network source to determine whether the data is indicative of an emergency condition.

17. The method of claim 12 further comprising the steps of:
    detecting a failed attempt or an interrupted connection to the emergency responder; and
    transmitting a non-response message by the first transmitter to the one or more medical devices.

18. The method of claim 12 further comprising the steps of:
    storing in a memory emergency condition data representing the emergency condition and one or more of a timestamp, an identifier for each of the one or more medical devices transmitting the emergency condition, and a location of the one or more medical devices;
    analyzing the stored data to identify trends in the emergency conditions; and
    monitoring at least one or more medical devices based on any identified trends.

19. The method of claim 12, wherein the transmitting step further comprises the step of transmitting an electronic text message containing information about the emergency condition to an emergency responder.

20. The wireless relay network of claim 12, wherein the emergency signal comprises a serial number used to uniquely identify the wireless relay module.

21. A wireless relay network comprising:

at least a first wireless relay module and a second wireless relay module, wherein each wireless relay module comprises a receiver capable of receiving a signal comprising medical device data from one or more medical devices over a wireless relay network, a first transmitter capable of transmitting the medical device data over an internet-accessible wireless communication network, and a second transmitter capable of transmitting the medical device data over a wireless relay network;

said first and second wireless relay modules including respective controllers, wherein each controller is capable of processing the received medical device data to detect information associated with the location of said one or more medical devices and of generating location information data for the one medical device; and said controller further being capable of selecting one of the first or second transmitter for transmitting said location information data to a remote monitoring device.

22. A wireless relay module comprising:

a receiver capable of wirelessly receiving medical device data over a wireless relay network from at least one medical device;

a first transmitter capable of wirelessly transmitting medical device data over the wireless relay network;

a second transmitter capable of wirelessly transmitting data over an internet-accessible wireless communication network;

a location device capable of generating a location signal;

a controller coupled to the first and second transmitters, the controller capable of selecting one of said first or second transmitter for transmitting medical device data received by the receiver, and establishing a connection using the first or second transmitter with an emergency responder when an emergency condition exists;

a phone device coupled to the controller, the phone device capable of initiating the connection with the emergency responder; and a signal generator coupled to the phone device, the signal generator capable of producing a signal indicative of the emergency condition and including the location signal, for transmission by the first or second transmitter to the emergency responder.

23. The wireless relay network of claim 22, where the location signal is based on a global positioning system ("GPS") signal.

24. The wireless relay network of claim 22, wherein the location signal is based on a mobile device position signal generated by the internet-accessible wireless communication network.

\* \* \* \* \*